(12) United States Patent
Singh et al.

(10) Patent No.: US 12,294,855 B2
(45) Date of Patent: May 6, 2025

(54) SYSTEMS AND METHODS FOR AUTHENTICATING USERS FOR SUBSCRIBED SERVICES

(71) Applicant: Verizon Patent and Licensing Inc., Basking Ridge, NJ (US)

(72) Inventors: Satish K. Singh, Chennai (IN); Vijay A. Senthil, Chennai (IN); Jaykishan Tiwari, Irving, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 302 days.

(21) Appl. No.: 17/854,350

(22) Filed: Jun. 30, 2022

(65) Prior Publication Data

US 2024/0007853 A1 Jan. 4, 2024

(51) Int. Cl.
*H04W 12/06* (2021.01)
*H04W 4/06* (2009.01)
*H04W 84/12* (2009.01)

(52) U.S. Cl.
CPC ............. *H04W 12/06* (2013.01); *H04W 4/06* (2013.01); *H04W 84/12* (2013.01)

(58) Field of Classification Search
CPC .... H04L 63/0853; H04W 12/06; H04W 4/10; H04W 48/02; H04W 84/12; G06Q 20/32
See application file for complete search history.

(56) References Cited

U.S. PATENT DOCUMENTS

| | | | |
|---|---|---|---|
| 9,264,419 B1* | 2/2016 | Johansson | G06F 21/45 |
| 9,692,732 B2* | 6/2017 | Stalzer | H04L 63/08 |
| 2016/0234320 A1* | 8/2016 | Chang | H04L 67/51 |
| 2017/0126640 A1* | 5/2017 | Vincent | H04L 63/083 |
| 2020/0204543 A1* | 6/2020 | Lee | H04L 63/083 |
| 2020/0213298 A1* | 7/2020 | Ericson | H04W 12/47 |

* cited by examiner

*Primary Examiner* — Daniel B Potratz
*Assistant Examiner* — Faghia Telat Rana

(57) ABSTRACT

In some implementations, a first device may connect to a network, wherein the first device is associated with a first application that is associated with a service provider. The first device may detect that a second device connected to the network is associated with a second application that is associated with the service provider. The first device may receive, from the second device, identification information associated with the second device. The first device may transmit, to a third device associated with the service provider, the identification information associated with the second device. The first device may receive, from the third device, authentication information permitting the first application to operate on the network based on the third device receiving the identification information associated with the second device.

20 Claims, 12 Drawing Sheets

SYSTEMS AND METHODS FOR AUTHENTICATING USERS FOR SUBSCRIBED SERVICES

BACKGROUND

Internet service providers (ISPs) or similar service providers may offer customers a variety of services, such as Internet services, data services, television services, telephony services, streaming services, or the like. A user may subscribe to certain services but not to others depending on the user's needs and preferences. When connecting an application associated with a service to a network, such as a wireless local area network (WLAN) or the like, the user may be prompted to enter identification information associated with the user's subscription, such as login credentials or similar identification information. The identification information may be provided to access account information in order to verify the user's subscription information.

DETAILED DESCRIPTION OF EXAMPLE EMBODIMENTS

Figure 1A:
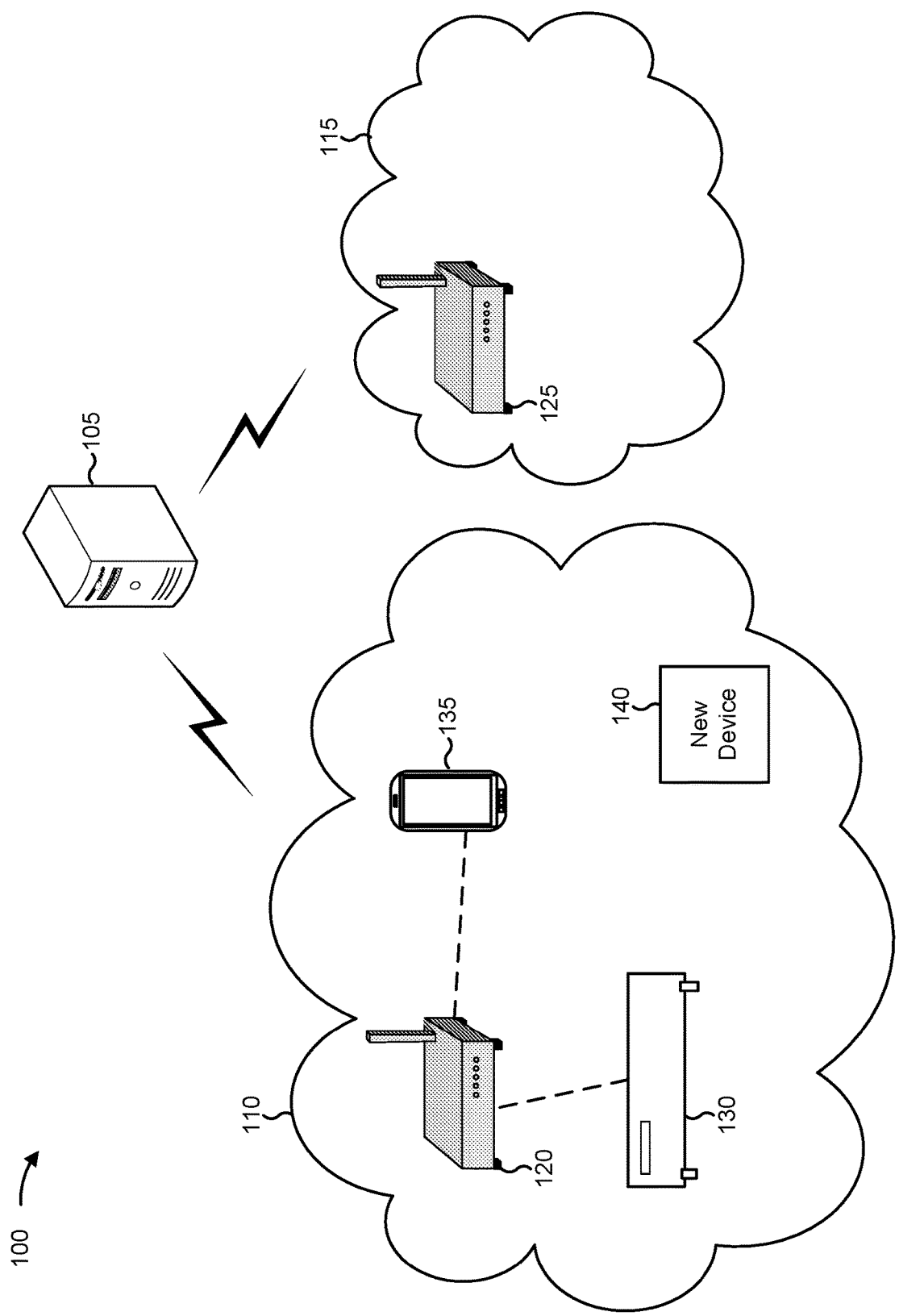
FIGS. 1A-1I are diagrams of an example associated with authenticating users for subscribed services.

The following detailed description of example implementations refers to the accompanying drawings. The same reference numbers in different drawings may identify the same or similar elements.

A service provider, such as an Internet service provider (ISP), may offer various services to users, such as Internet services, data services, television services, telephony services, streaming services, or similar services. A user may subscribe to certain services, but not to others, based on the user's preferences and needs. When accessing a particular service or subscription, a user may be prompted to provide identification information associated with the user, such as login credentials (e.g., a username and a corresponding password), which may be used by the ISP to verify that the user has subscribed to the particular service or subscription being accessed. For a user that is subscribed to many services, this may become burdensome, as the user may be required to enter identification information numerous times, one or more times for each subscribed service. Moreover, each time a user subscribes to a new service and/or attempts to use a service on a new network, the user may be required to re-enter identification information, which can be tedious and lead to a negative customer experience.

Some implementations described herein enable automatic authentication of a user for subscribed services, reducing the time, computing, power, and similar resources expended to verify a user's subscription information while improving a customer experience associated with adding new subscriptions and/or using existing subscriptions and/or services outside of a home network. In some implementations, when an application associated with a service provider connects to a user's home network for the first time, the application may broadcast a message to other applications operating on the home network that seeks identification information associated with other applications. If one or more applications operating on the home network are associated with same service provider as the new application (and thus are capable of receiving and interpreting the broadcast message), the one or more applications may transmit identification information to the new application, such as a serial number or the like associated with the one or more applications. The new application may transmit the identification information to a backend server that is associated with the service provider, which may access subscription information associated with the user based on the identification information. If the backend server verifies that the user is subscribed to a service associated with the new application, the backend server may provide authentication information, such an authentication token, to the new application, permitting the user to operate on the network without requiring the user to input login credentials or the like. This may reduce time and resource consumption associated with a subscription authentication process while improving the overall customer experience for the user when subscribing to a new service. This will be more readily understood with reference to FIGS. 1A-1I.

FIGS. 1A-1I are diagrams of an example 100 associated with authenticating users for subscribed services. As shown in FIGS. 1A-1I, example 100 includes a backend device 105, a first network 110 (e.g., a first wireless local area network (WLAN), or a similar network, sometimes referred to herein as a user's home network), and a second network 115 (e.g., a second WLAN or similar network, sometimes referred to herein as a visiting network). As shown in FIGS. 1A-1I, the first network 110 and the second network 115 may be in communication with the backend device 105. The backend device 105 may be a server or similar device associated with a service provider (e.g., ISP), and may be associated with authenticating new users and/or maintaining user subscription information, including information regarding various services to which the user is subscribed. For example, in some implementations, the backend device 105 may be associated with a database that stores user identification information (e.g., serial numbers of user devices, or the like) and corresponding subscription information (e.g., information indicating various services to which a user is subscribed). In some implementations, the backend device 105, the first network 110, and/or the second network 115 may be associated with the same service provider, such as the same Internet service provider (ISP) or similar service provider. For example, the service provider may be an ISP providing connectivity to the Internet, and the first network 110 and/or the second network 115 may be private networks providing connectivity to the Internet via the ISP.

Moreover, each network 110, 115 may be associated with a networking device, such as an access point (AP), a router, a gateway, a wireless access point, a modem, or the like, that provides connectivity to one or more client devices operating on the corresponding network. For example, the first network 110 may be associated with a first networking device 120 that provides connectivity to client devices on the first network 110, and the second network 115 may be associated with a second networking device 125 that provides connectivity to client devices on the second network 115. More particularly, a client device may establish a wired or wireless connection with the corresponding networking device 120, 125 in order to communicate with other devices on the corresponding network 110, 115 and/or on other networks via the backend device 105, via a core network, via the Internet, or the like. For example, as shown in FIG. 1A, two client devices are connected to the first network 110 via the first networking device 120: a first client device 130, which may be a set-top box or a similar client device, and a second client device 135, which may be a user equipment (UE) or a similar device.

Moreover, one or more of the client devices 130, 135 may be associated with an application and/or a service associated with the server provider. For example, the first client device 130 (e.g., a set-top box) may be associated with a television service and/or a television application associated with the service provider, and/or the second client device 135 (e.g., a UE) may be associated with an Internet service and/or an Internet application associated with the service provider. In some implementations, one or more of the client devices 130, 135 may be pre-provisioned with subscription information permitting the client devices 130, 135 and/or associated applications to operate on the first network 110. For example, the first client device 130 (e.g., a set-top box) may be provided by the service provider pre-provisioned with an authentication token or the like enabling the user to access television services when the first client device 130 is connected to the first network 110 (e.g., when the first client device 130 establishes a wired or wireless connection with the first networking device 120).

Additionally, or alternatively, one or more of the client devices 130, 135 and/or an associated application may prompt a user to enter identification information during a setup procedure or the like, which may permit the client devices 130, 135 and/or associated applications to operate on the first network 110. For example, after connecting the second client device 135 (e.g., a UE) to the first networking device 120, the user may be prompted to input login credentials (e.g., a username and password). The first networking device 120 or another network device may transmit the login credentials or similar information to the backend device 105, which may verify the user's subscription based on the login credentials or similar information (e.g., which may verify that the user, as identified via the login credentials, has subscribed to services associated with the second client device 135). Once verified, the backend device 105 may provide an authentication token or the like to the first networking device 120 and/or the second client device 135, permitting the user to use the associated application on the network (e.g., permitting the user to use Internet services via the UE, or the like).

In some implementations, a new device (e.g., a device connecting to the first network 110 for a first time) and/or a new application may be automatically authenticated based on other devices and/or applications connected to, or operating on, the first network 110. For example, as shown in FIG. 1A, a new device 140 may be introduced to the first network 110. The new device 140 may be associated with the service provider and/or may be associated with an application that is associated with the service provider. For example, the new device 140 may be a set-top box, a streaming app, an IoT device, a UE, or a similar device running an application associated with a service provided by the service provider (e.g., an Internet service, a data service, a television service, a telephony service, a streaming service, or the like). Moreover, as shown in FIG. 1A, the new device 140 may be introduced to the first network 110. For example, in aspects in which the first network 110 is a WLAN or the like, the new device 140 may be placed within wireless range of the first networking device 120 in order to connect to the first network 110.

Figure 1B:
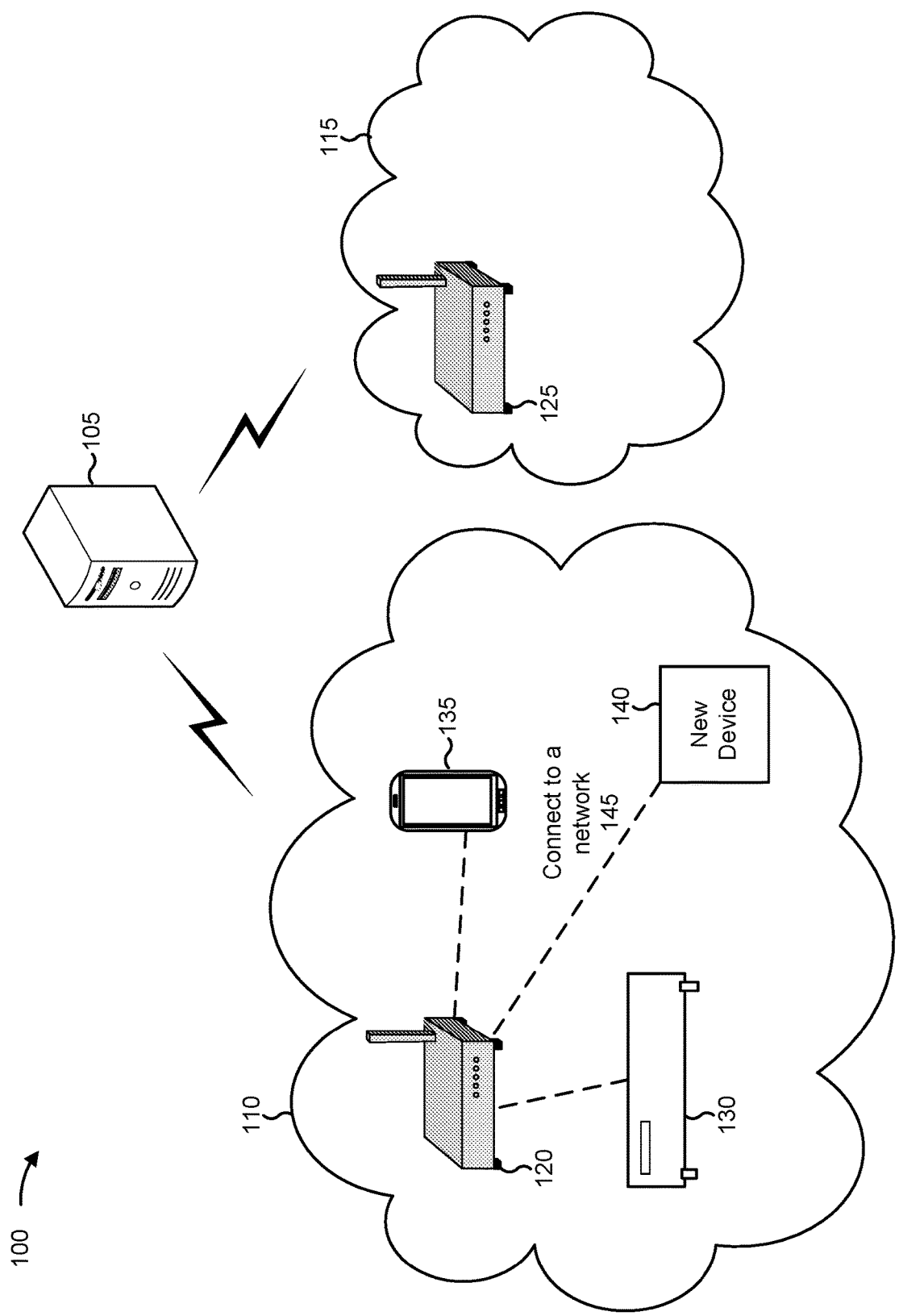

As shown by FIG. 1B, the new device 140 may connect to the first network 110, indicated by reference number 145. More particularly, the new device 140 may establish a wired or wireless connection to the first networking device 120 or a similar device, which may provide connectivity to the backend device 105 or other network services and devices. In some implementations, the new device 140 may establish a connection to the first network 110 by a user entering network credentials or the like (e.g., a wireless network password or a similar credential).

In some implementations, one or more devices and/or applications already connected to the first network 110 may be associated with the same service provider as the new device 140 and/or as an application associated with the new device 140. For example, one or more of the first networking device 120 and/or an application associated with the first networking device 120, the first client device 130 and/or an application associated with the first client device 130, or the second client device 135 and/or an application associated with the second client device 135 may be associated with the same service provider as the new device 140 and/or an application associated with (e.g., operating on) the new device 140. Moreover, in some implementations, the new device 140 and/or an application associated with the new device 140 may be automatically authenticated when the new device 140 connects to the first network 110 based on another device or application operating on the first network 110 that is associated with the same service provider.

Figure 1C:
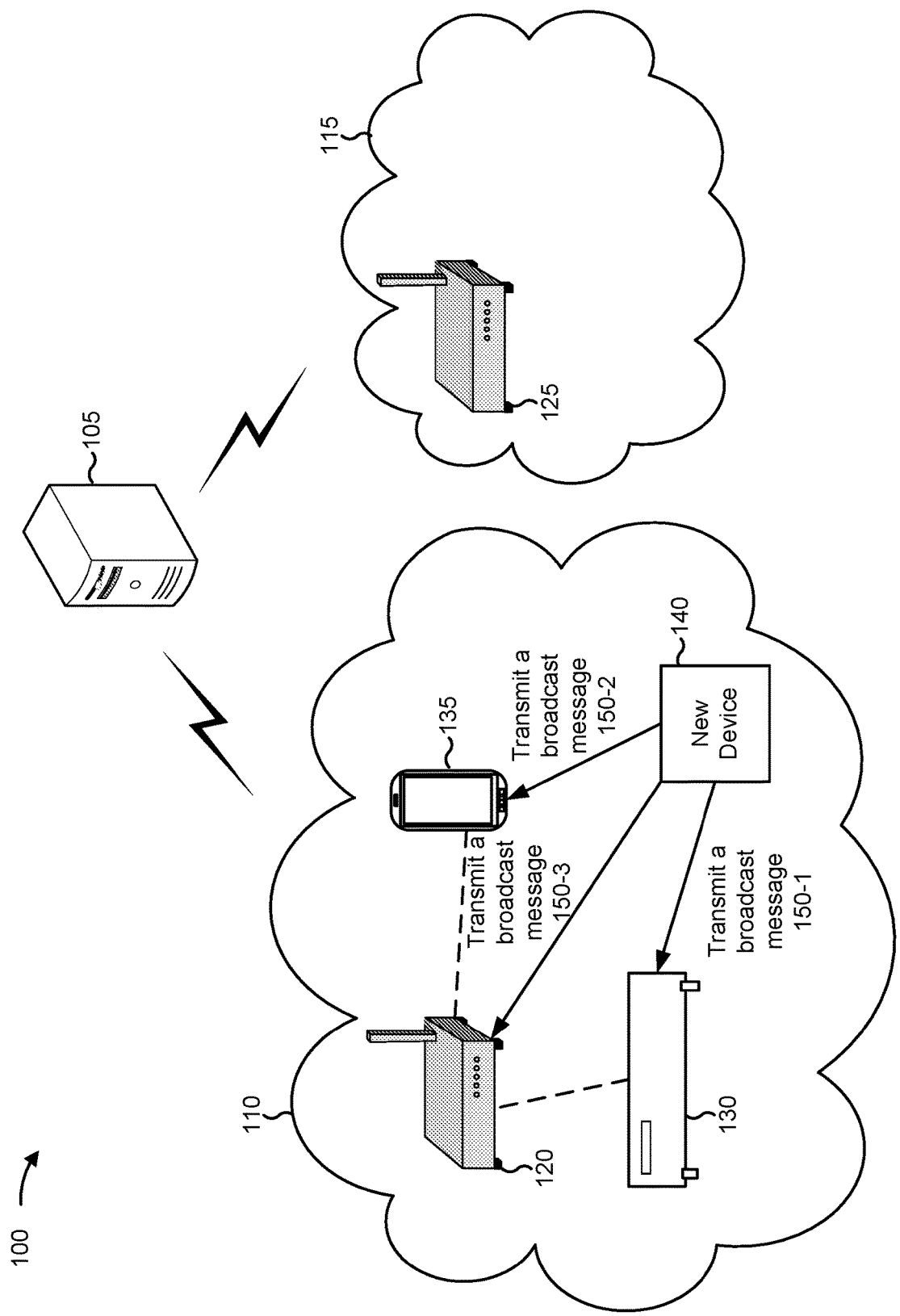

More particularly, as shown by FIG. 1C, the new device 140 may transmit a broadcast message that is received by one or more devices operating on the first network 110. For example, the new device 140 may broadcast a message using a user datagram protocol (UDP) or the like, which may be received by the first client device 130 (as shown by reference number 150-1), the second client device 135 (as shown by reference number 150-2), the first networking device 120 (as shown by reference number 150-3), or another device. In that regard, in some implementations, the message indicated by reference numbers 150-1, 150-2, and 150-3 may be a datagram including a header containing information indicating that the message is intended for other devices associated with the service provider. In some implementations, the broadcast message (e.g., the UDP broadcast message) may be an encrypted message. For example, the broadcast message may be encrypted using an advanced encryption standard (AES), such as AES 256, or the like. Each device (e.g., the first client device 130, the second client device 135, the new device 140, the first networking device 120, or a similar device) may include a software application enabling the broadcasting and/or receiving the broadcast messages shown in connection with reference numbers 150-1, 150-2, and/or 150-3.

Figure 1D:
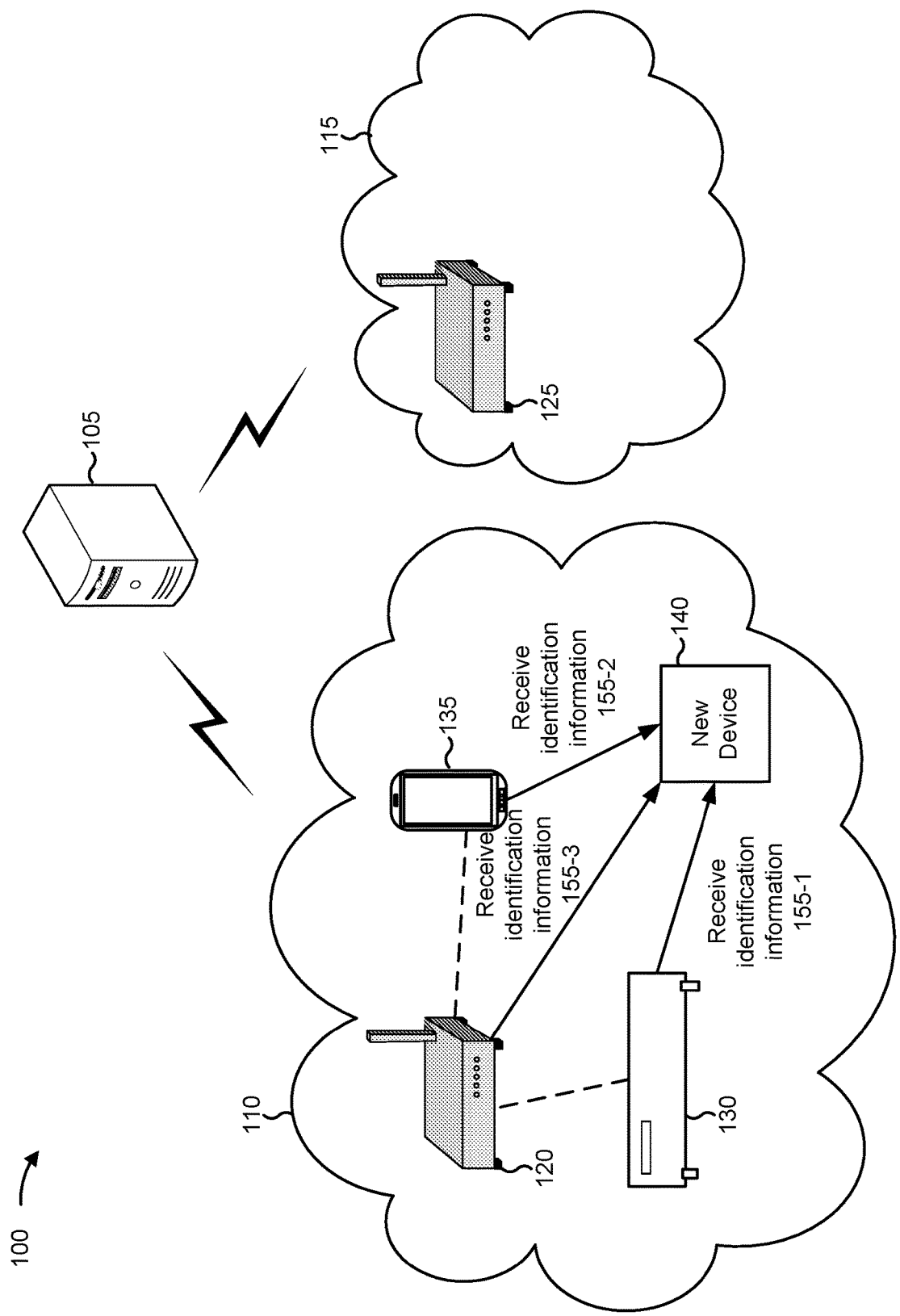

Upon receipt of the broadcast message (e.g., the UDP broadcast message), the first client device 130, the second client device 135, the first networking device 120, and/or another device may decrypt the message, interpret data contained in the message, establish a connection with the new device 140, and/or transmit data to the new device 140. In some implementations, the first client device 130, the second client device 135, the first networking device 120, or another device may establish a transmission control protocol/Internet protocol (TCP/IP) connection with the new device 140. After a connection has been established, and as shown by FIG. 1D, the new device 140 may receive identification information from another device connected to the network 110, such as the first client device 130 (shown by reference number 155-1), the second client device 135

(shown by reference number 155-2), the first networking device 120 (shown by reference number 155-3), or another device. For example, the new device 140 may receive identification information from the first client device 130, the second client device 135, and/or the first networking device 120 via a TCP/IP communication or a similar communication. In some implementations, the identification information may include a unique identifier associated with the first client device 130, the second client device 135, and/or the first networking device 120 and/or a unique identifier associated with an application associated with the first client device 130, an application associated with the second client device 135, and/or an application associated with the first networking device 120. For example, in some implementations, the identification information may include a serial number associated with the first client device 130, a serial number associated with the second client device 135, and/or a serial number associated with the first networking device 120.

Figure 1E:
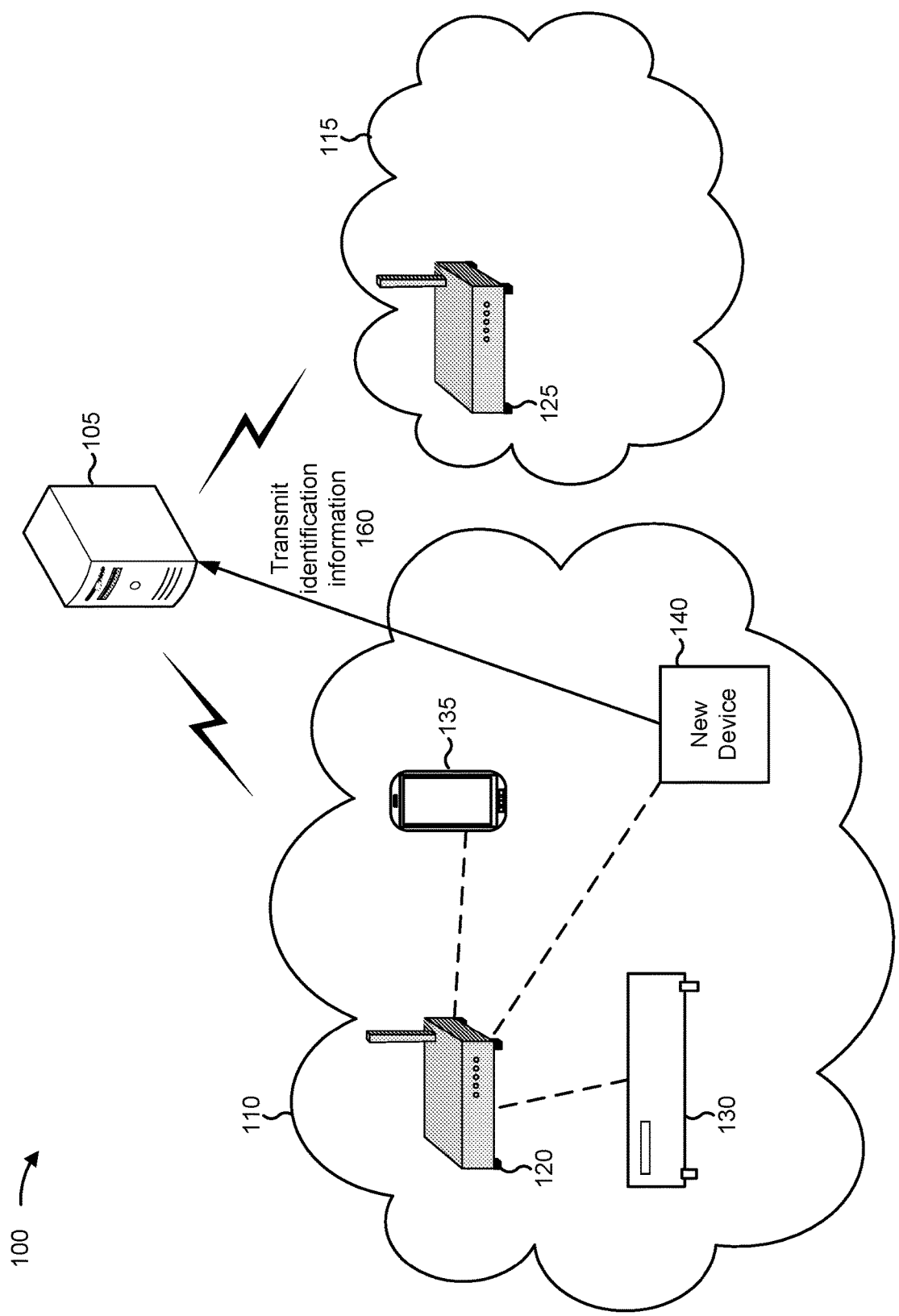

As shown by FIG. 1E, and as indicated by reference number 160, the new device 140 and/or an application associated with the new device 140 may transmit, to the backend device 105, the identification information associated with the first client device 130 and/or the second client device 135. For example, in implementations in which the identification information described in connection with reference numbers 155-1 and 155-2 included a serial number associated with the first client device 130, the second client device 135, and/or the first networking device 120, the new device 140 may transmit an indication of the serial number associated with the first client device 130, the second client device 135, and/or the first networking device 120 to the backend device 105. In some implementations, the new device 140 may transmit the identification information to the backend device 105 using a communication associated with an encryption protocol and/or a security protocol. For example, the new device 140 may transmit the identification information to the backend device 105 using a communication associated with a Rivest-Shamir-Adleman (RSA) cryptosystem (sometimes referred to as a public-key cryptosystem), using a communication associated with a private-key cryptosystem, or using a communication associated with a similar cryptosystem. Additionally, or alternatively, the new device 140 may transmit the identification information to the backend device 105 using a communication associated with a secure hash algorithm (SHA) security protocol, such as an SHA-512 security protocol or a similar security protocol.

In some implementations, the backend device 105 may determine subscription information associated with the user based on the identification information transmitted to the backend device 105 by the new device 140. For example, the backend device 105 may be a server (or else may be associated with a server) that stores a database containing user profile information, such as subscription information associated with a user, identification information associated with a user (e.g., serial numbers or similar unique identifiers associated with a user), and similar information and/or parameters. In some implementations, the database may include an indication of various services to which a user is subscribed (e.g., Internet services, data services, television services, telephony services, streaming services, or the like) along with an indication of known unique identifiers (e.g., serial numbers) associated with the user and/or associated with the user's home network, such as the first network 110. In that regard, in some implementations, the backend device 105 may access a user's subscription information by looking up the identification information in the database and determining associated services to which the user is subscribed.

Figure 1F:
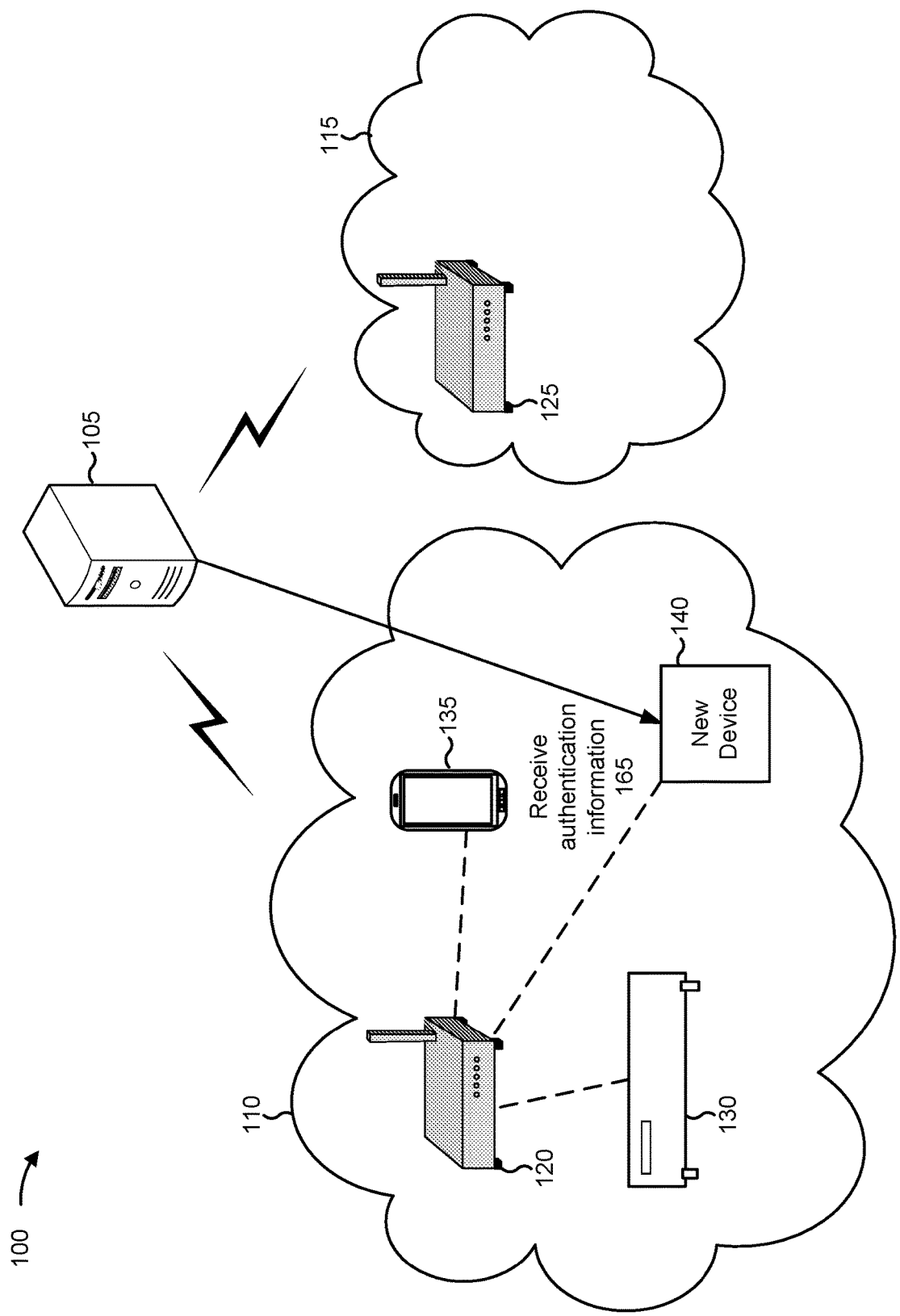

As shown in FIG. 1F, and with reference to reference number 165, in implementations in which the user is subscribed to one or more services associated with the new device 140 and/or with an application associated with the new device 140, the backend device 105 may transmit, to the new device 140, authentication information associated with the new device 140 and/or associated with an application associated with the new device 140. For example, in some implementations, the backend device 105 may transmit, to the new device 140, an authentication token or the like permitting a subscription to continue on the new device 140 and/or an application associated with the new device 140. Put another way, in some implementations, the authentication information provided to the new device 140 in the transmission described in connection with reference number 165 may permit the new device 140 and/or an application associated with the new device 140 to operate on the first network 110 based on the backend device 105 receiving the identification information associated with one of the first client device 130, the second client device 135, and/or the first networking device 120. In this way, the new device 140 and/or an application associated with the new device 140 may be automatically authenticated without requiring a user to input identification information or requiring the user to specifically add the device to a registry of devices authorized for receiving the services.

By way of example, a user may subscribe to a high-speed Internet service provided by an ISP, and may use a router (which may correspond to the first networking device 120) provided by the ISP to establish a home network (which may correspond to the first network 110). The user may thereafter subscribe to an additional service offered by the ISP, such as a video streaming service associated with a video streaming device (which may correspond to the new device 140). When the user plugs in the video streaming device and/or connects to the home network, the video streaming device may automatically detect that the home network is associated with a router provided by the ISP (such as be sending and receiving UDP and/or TCP/IP messages to the router, as described). The video streaming device may automatically detect from a backend device (which may correspond to the backend device 105) if the user is subscribed to video streaming services associated with the ISP, such as by providing a unique identifier associated with the router (e.g., the router's serial number) to the backend device and, in response, receiving an authentication token from the backend device permitting the video streaming service to continue. More particularly, if the user is subscribed to video streaming services, the user may be automatically logged in to the video streaming device with information about the user's subscription without the user needing to enter login credentials (e.g., a username and password), without the user having to use a browser or similar program to authenticate the user's subscription, and/or without requiring additional actions by the user. As a result, the user may be provided with a seamless first experience for the new video streaming service.

In some implementations, the backend device 105 may be unable to verify the user's subscription information. For example, if a database associated with the backend device 105 does not include the identification information that is transmitted to the backend device 105 (as described above in connection with reference number 160), the backend device 105 may be unable to verify the user's identity and/or may be unable to determine if the user is subscribed to a service associated with the new device 140 and/or an application associated with the new device 140. In such implementations, rather than transmitting authentication information (e.g., an authentication token) to the new device 140 as described above, the backend device 105 may transmit a communication indicating that the corresponding subscription information was not found. In such aspects, the user may be prompted to then enter subscription information and/or identification information in order to verify subscription details. For example, in response to the new device 140 and/or an application associated with the new device 140 receiving an indication that the corresponding subscription information was not found, the user may be prompted to enter login credentials associated with an account that is associated with the service provider, which may then be provided to the backend device 105 or another device to verify the subscription information.

Figure 1G:
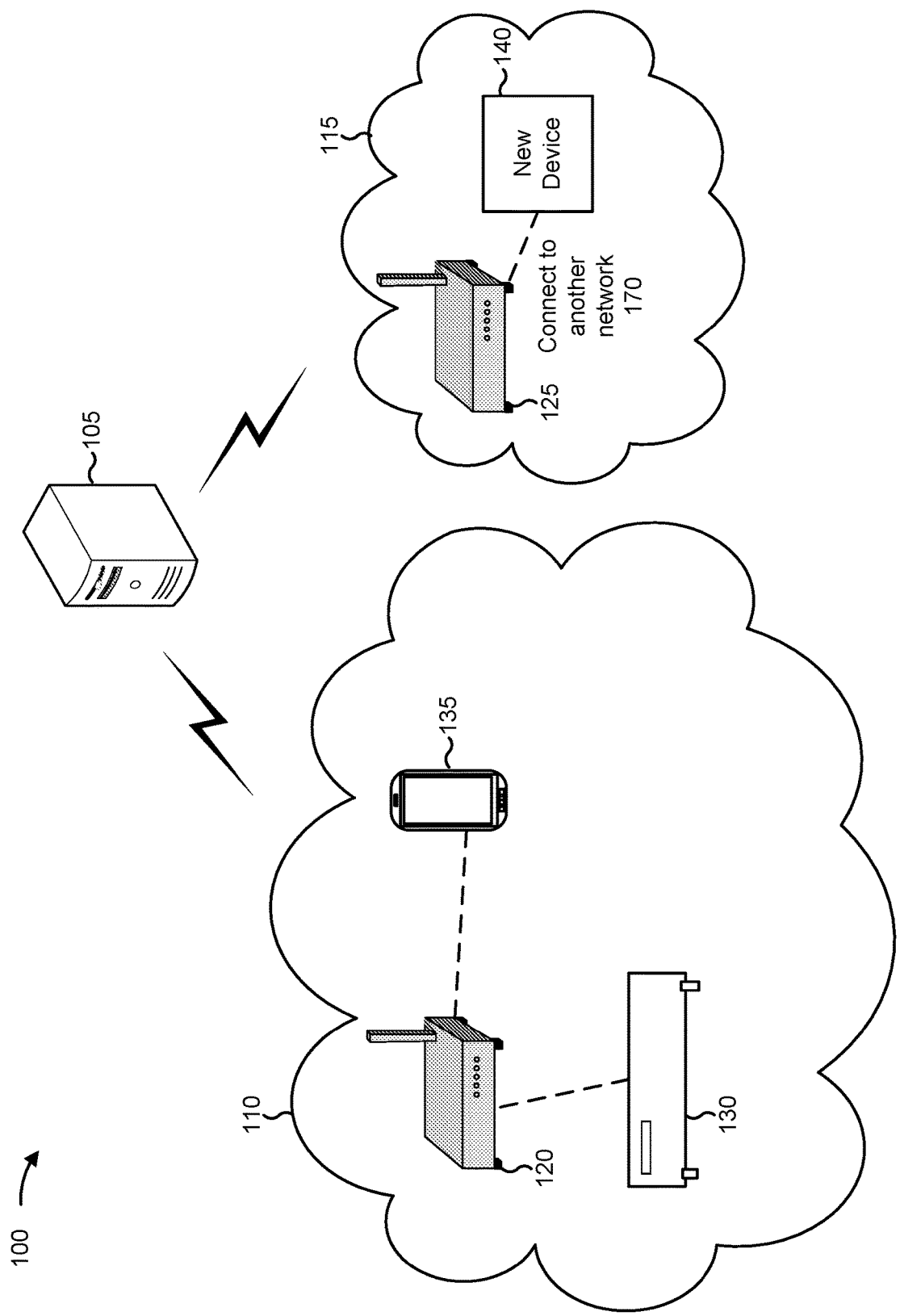
Figure 1H:
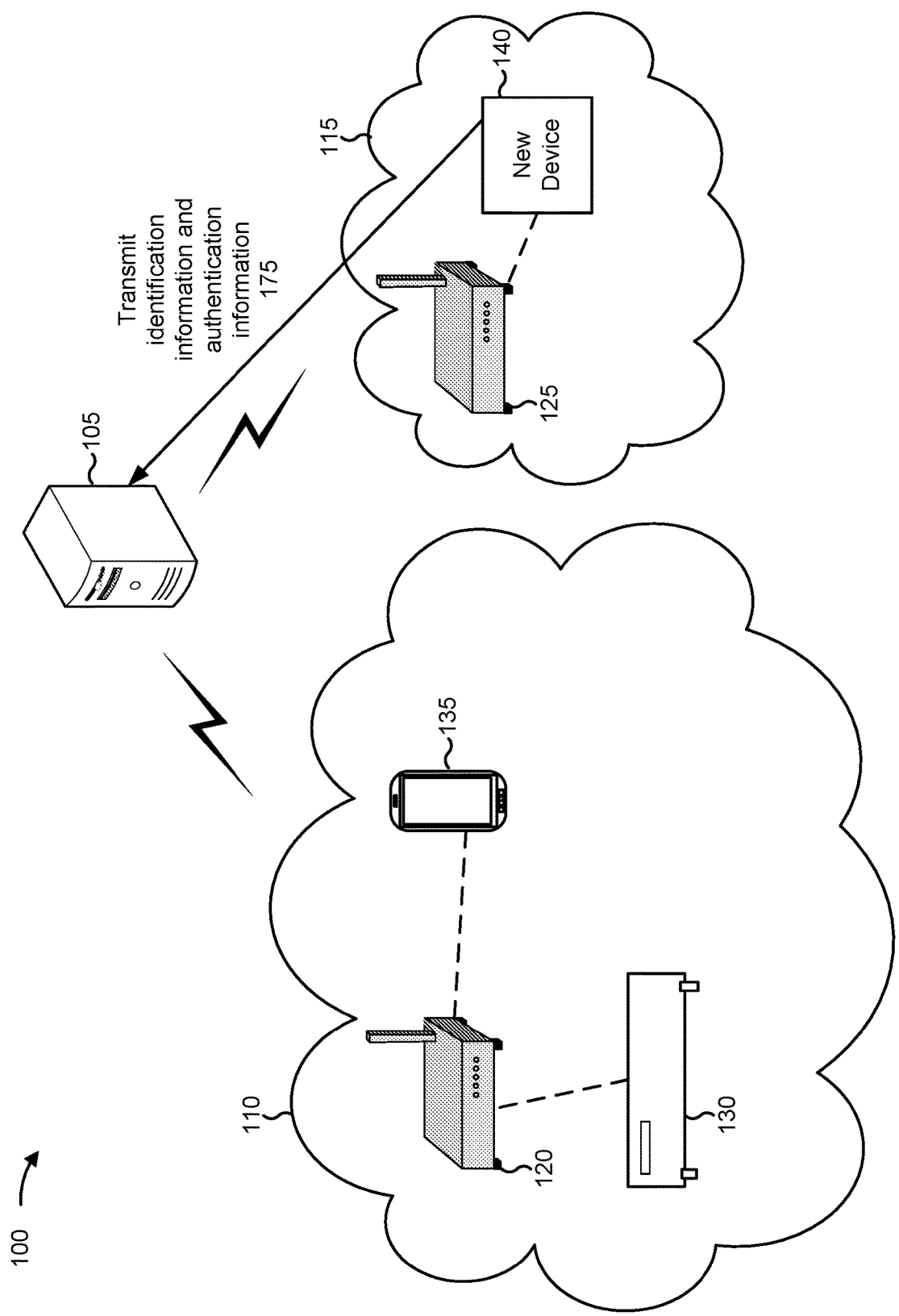
Figure 1I:
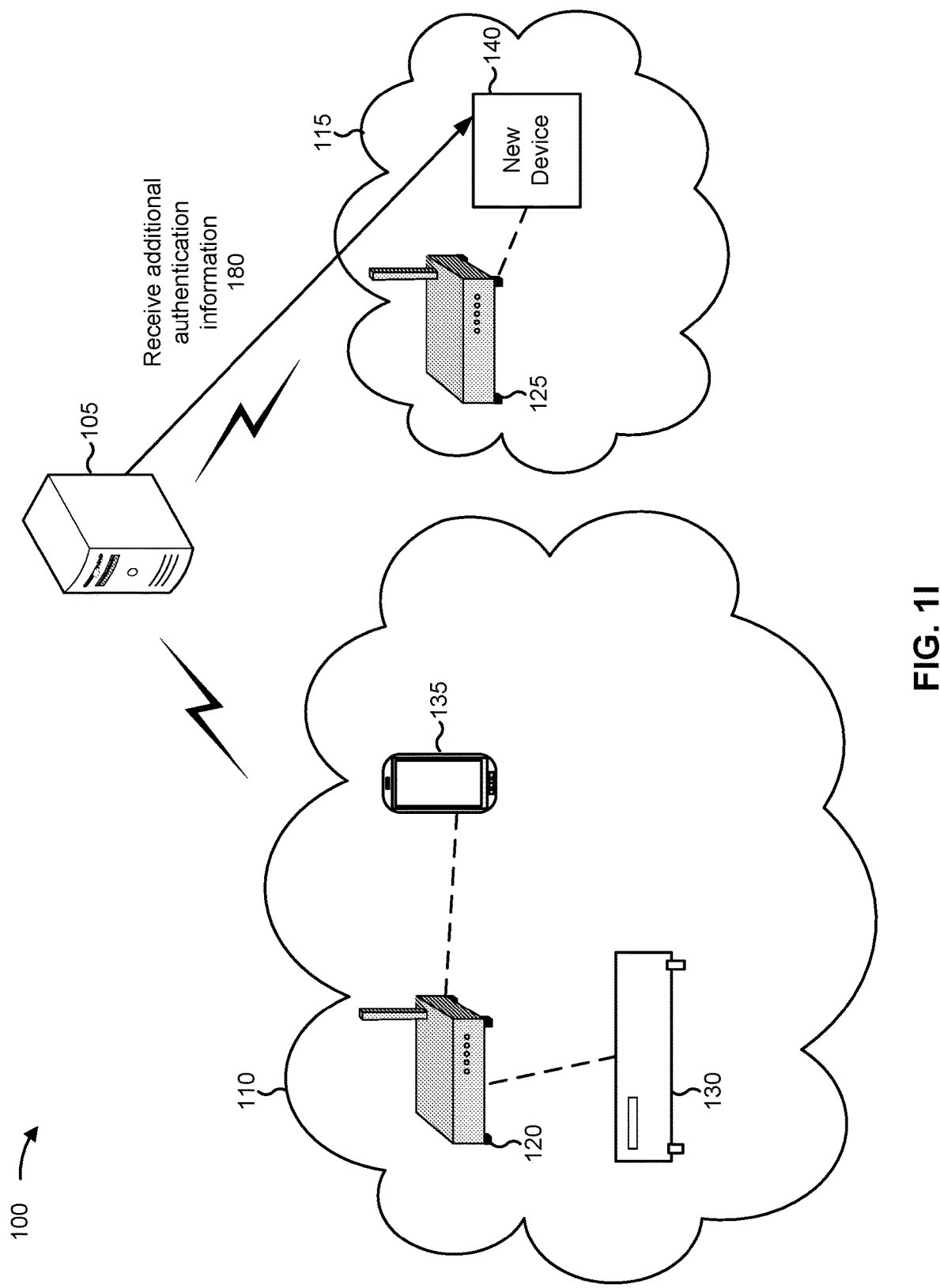

In some implementations, the backend device 105 or a similar network device may store identification information associated the new device 140 (e.g., a serial number or other unique identifier) and any authentication information previously provided to the new device 140 (e.g., a last-used authentication token) such that, if the new device 140 later connects to a different network, such as a visiting private network or the like, the new device 140 and/or an application associated with the new device 140 may be automatically authenticated on the different network without requiring the user to input subscription information and/or identification information. For example, as shown by FIG. 1G, and as indicated by reference number 170, the new device 140 may connect to the second network 115, such as by establishing a wired or wireless connection with the second networking device 125. In some implementations, as shown in FIG. 1H, and as indicated by reference number 175, the new device 140, via the second network 115, may transmit identification information (e.g., a serial number associated with the new device 140, or a similar unique identifier) and/or authentication information (e.g., a last-used valid authentication token) to the backend device 105. The backend device 105 may have previously stored the identification information associated with the new device 140 and/or may have previously mapped the identification information associated with the new device 140 to subscription information, such as when the new device 140 first communicated with the backend device 105 via the first network 110, as described above in connection with reference numbers 160 and 165. Accordingly, the backend device 105 may access a user's subscription information, such as by looking up the identification information (e.g., the unique identifier associated with the new device 140) and/or authentication information (e.g., the last-used valid authentication token) in a database. More particularly, the backend device 105 may determine that the new device 140 and/or an application associated with the new device 140 is authorized to use a particular service based on the identification information (e.g., a serial number) and/or the authentication information (e.g., a last-used authentication token) transmitted to the backend device 105. As shown in FIG. 1I, and with reference to reference number 180, in response to determining that the user is subscribed to services associated with the new device 140 and/or an application associated with the new device 140, the backend device 105 may transmit, to the new device 140, additional authentication information, such as an updated authentication token, or the like, permitting the user to continue to use the allowed subscription on the second network 115.

By automatically authenticating users for subscribed services in the manner described herein, some implementations described herein enable reduced time, computing, power, and similar resources required to verify a user's subscription information. Additionally, by automatically authenticating users for subscribed services in the manner described herein, some implementations described herein result in an improved customer experience associated with adding new subscriptions and/or using existing subscriptions and/or services outside of a home network.

As indicated above, FIGS. 1A-1I are provided as an example. Other examples may differ from what is described with regard to FIGS. 1A-1I. The number and arrangement of devices shown in FIGS. 1A-1I are provided as an example. In practice, there may be additional devices, fewer devices, different devices, or differently arranged devices than those shown in FIGS. 1A-1I. Furthermore, two or more devices shown in FIGS. 1A-1I may be implemented within a single device, or a single device shown in FIGS. 1A-1I may be implemented as multiple, distributed devices. Additionally, or alternatively, a set of devices (e.g., one or more devices) shown in FIGS. 1A-1I may perform one or more functions described as being performed by another set of devices shown in FIGS. 1A-1I.

Figure 2:
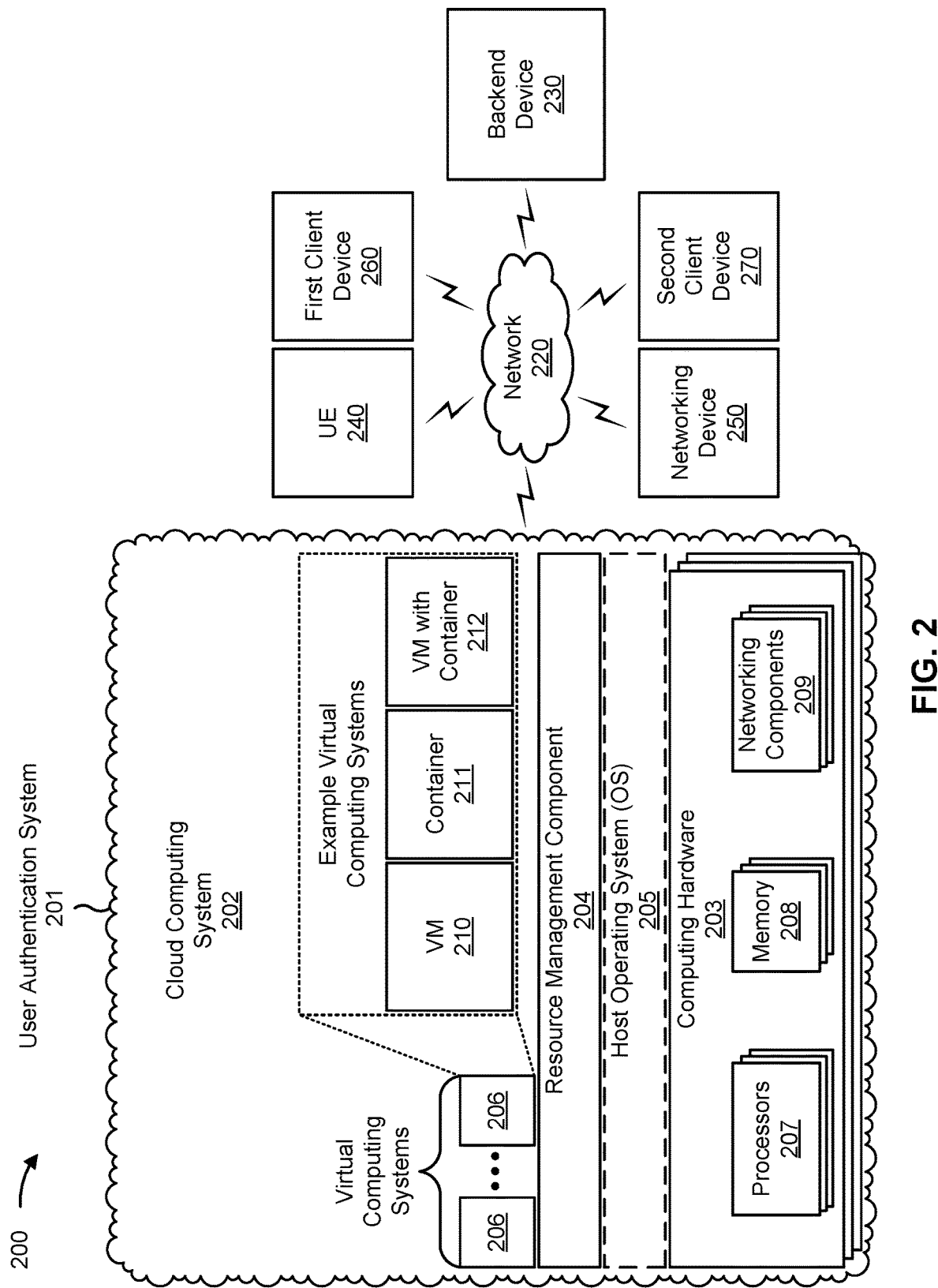
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a user authentication system 201, which may include one or more elements of and/or may execute within a cloud computing system 202. The cloud computing system 202 may include one or more elements 203-212, as described in more detail below. As further shown in FIG. 2, environment 200 may include a network 220, a backend device 230, a UE 240, a networking device 250, a first client device 260, and/or a second client device 270. Devices and/or elements of environment 200 may interconnect via wired connections and/or wireless connections.

The cloud computing system 202 includes computing hardware 203, a resource management component 204, a host operating system (OS) 205, and/or one or more virtual computing systems 206. The cloud computing system 202 may execute on, for example, an Amazon Web Services platform, a Microsoft Azure platform, or a Snowflake platform. The resource management component 204 may perform virtualization (e.g., abstraction) of computing hardware 203 to create the one or more virtual computing systems 206. Using virtualization, the resource management component 204 enables a single computing device (e.g., a computer or a server) to operate like multiple computing devices, such as by creating multiple isolated virtual computing systems 206 from computing hardware 203 of the single computing device. In this way, computing hardware 203 can operate more efficiently, with lower power consumption, higher reliability, higher availability, higher utilization, greater flexibility, and lower cost than using separate computing devices.

Computing hardware 203 includes hardware and corresponding resources from one or more computing devices. For example, computing hardware 203 may include hardware from a single computing device (e.g., a single server) or from multiple computing devices (e.g., multiple servers), such as multiple computing devices in one or more data centers. As shown, computing hardware 203 may include one or more processors 207, one or more memories 208, and/or one or more networking components 209. Examples of a processor, a memory, and a networking component (e.g., a communication component) are described elsewhere herein.

The resource management component 204 includes a virtualization application (e.g., executing on hardware, such as computing hardware 203) capable of virtualizing computing hardware 203 to start, stop, and/or manage one or more virtual computing systems 206. For example, the resource management component 204 may include a hypervisor (e.g., a bare-metal or Type 1 hypervisor, a hosted or Type 2 hypervisor, or another type of hypervisor) or a virtual machine monitor, such as when the virtual computing systems 206 are virtual machines 210. Additionally, or alternatively, the resource management component 204 may include a container manager, such as when the virtual computing systems 206 are containers 211. In some implementations, the resource management component 204 executes within and/or in coordination with a host operating system 205.

A virtual computing system 206 includes a virtual environment that enables cloud-based execution of operations and/or processes described herein using computing hardware 203. As shown, a virtual computing system 206 may include a virtual machine 210, a container 211, or a hybrid environment 212 that includes a virtual machine and a container, among other examples. A virtual computing system 206 may execute one or more applications using a file system that includes binary files, software libraries, and/or other resources required to execute applications on a guest operating system (e.g., within the virtual computing system 206) or the host operating system 205.

Although the user authentication system 201 may include one or more elements 203-212 of the cloud computing system 202, may execute within the cloud computing system 202, and/or may be hosted within the cloud computing system 202, in some implementations, the user authentication system 201 may not be cloud-based (e.g., may be implemented outside of a cloud computing system) or may be partially cloud-based. For example, the user authentication system 201 may include one or more devices that are not part of the cloud computing system 202, such as device 300 of FIG. 3, which may include a standalone server or another type of computing device. The user authentication system 201 may perform one or more operations and/or processes described in more detail elsewhere herein.

Network 220 includes one or more wired and/or wireless networks. For example, network 220 may include a cellular network, a public land mobile network (PLMN), a local area network (LAN), a WLAN, a wide area network (WAN), a private network, the Internet, and/or a combination of these or other types of networks. The network 220 enables communication among the devices of environment 200.

The backend device 230 (e.g., backend device 105) may include one or more servers associated with a core network, such as a core wireless communication network or the like. In some implementations, the backend device 230 may be a server associated with one or more databases storing subscription information associated with one or more users of a service provider, such as a service provider offering as Internet services, data services, television services, telephony services, streaming services, or the like. In some implementations, the backend device may include the user authentication system 201, may be the user authentication system 201, may be a component of the user authentication system 201, and/or may otherwise be associated with the user authentication system 201.

The UE 240 may include one or more devices capable of receiving, generating, storing, processing, and/or providing information, such as information described herein. For example, the UE 240 can include a mobile phone (e.g., a smart phone or a radiotelephone), a laptop computer, a tablet computer, a desktop computer, a handheld computer, a gaming device, a wearable communication device (e.g., a smart watch or a pair of smart glasses), a mobile hotspot device, a fixed wireless access device, customer premises equipment, an autonomous vehicle, or a similar type of device. In some implementations, one or more of the first client device 130, the second client device 135, and/or the new device 140 may be a UE 240 or else may be associated with a UE 240.

The networking device 250 may include one or more devices capable of providing connectivity via a network (e.g., the first network 110, the second network 115, the network 220, or a similar network) to one or more devices, such as to the UE 240, the first client device 260, the second client device 270, or a similar device. In some implementations, the networking device may provide connectivity to end users to allow the end user to access broadband Internet provided by an ISP. In some implementations, the networking device 250 may include, or else may be associated with, an AP, a router, a gateway, a wireless access point, a modem, or a similar device. In some implementations, the networking device 250 may be one of the first networking device 120 or the second networking device 125, or else may be associated with the first networking device 120 or the second networking device 125.

The first client device 260 and/or the second client device 270 may include any device capable of connecting to the network 220 via the networking device 250. In some implementations, the first client device 260 and/or the second client device 270 may include and/or may be associated with one or more applications, such as one or more applications associated with Internet services, data services, television services, telephony services, streaming services, or the like. Additionally, or alternatively, the first client device 260 and/or the second client device 270 may be a set-top box, a UE, or a similar device. In some implementations, the first client device 260 and/or the second client device 270 may be, or else may be associated with, the first client device 130, the second client device 135, and/or the new device 140.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
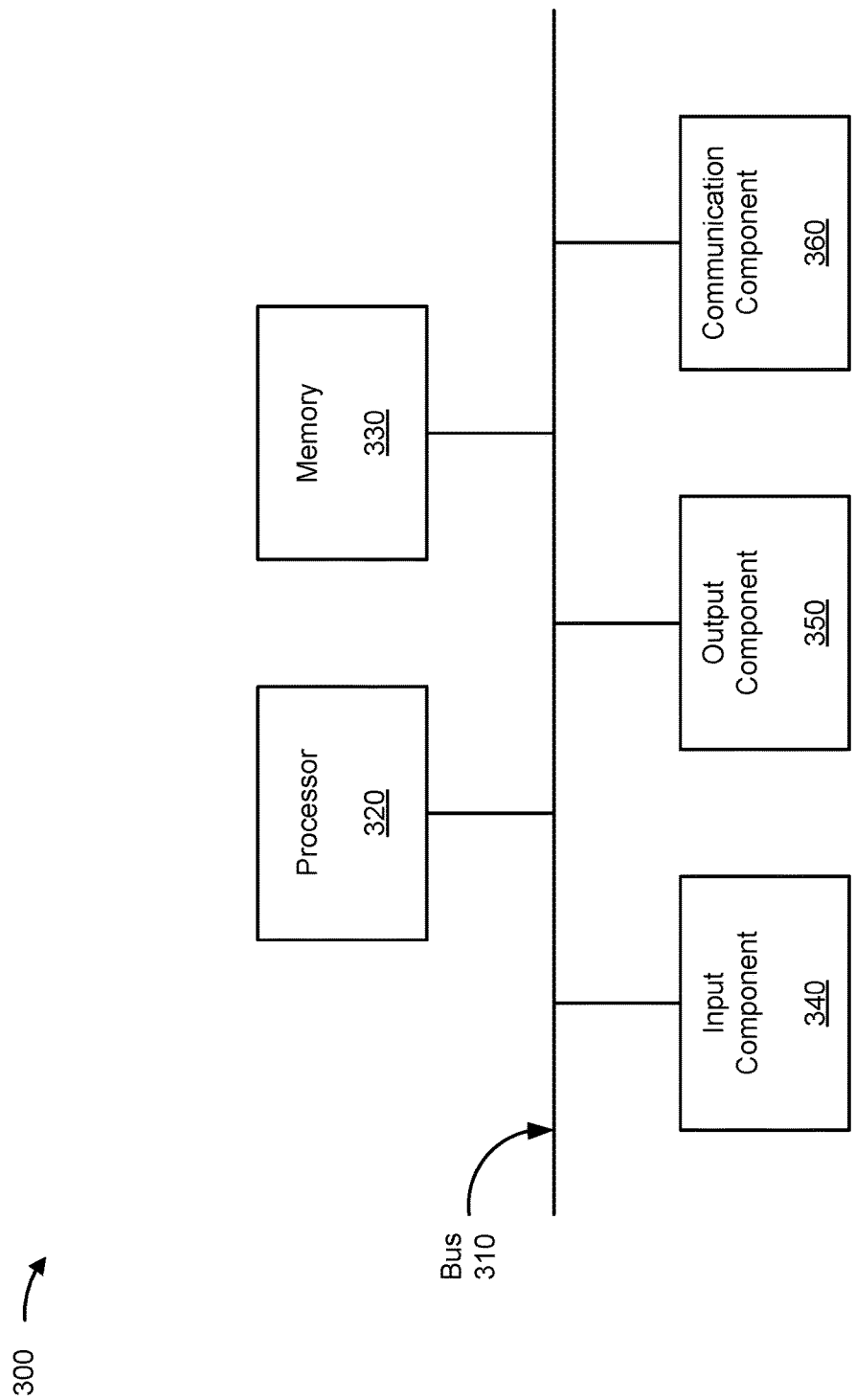
FIG. 3 is a diagram of example components of a device associated with authenticating users for subscribed services.

FIG. 3 is a diagram of example components of a device 300 associated with authenticating users for subscribed services. Device 300 may correspond to a backend device (e.g., backend device 230), a UE (e.g., UE 240), a networking device (e.g., networking device 250), and/or a client device (e.g., first client device 260 and/or second client device 270). In some implementations, the backend device 230, the UE 240, the networking device 250, the first client device 260, and/or the second client device 270 may include one or more devices 300 and/or one or more components of device 300. As shown in FIG. 3, device 300 may include a bus 310, a processor 320, a memory 330, an input component 340, an output component 350, and a communication component 360.

Bus 310 may include one or more components that enable wired and/or wireless communication among the components of device 300. Bus 310 may couple together two or more components of FIG. 3, such as via operative coupling, communicative coupling, electronic coupling, and/or electric coupling. Processor 320 may include a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 may include one or more processors capable of being programmed to perform one or more operations or processes described elsewhere herein.

Memory 330 may include volatile and/or nonvolatile memory. For example, memory 330 may include random access memory (RAM), read only memory (ROM), a hard disk drive, and/or another type of memory (e.g., a flash memory, a magnetic memory, and/or an optical memory). Memory 330 may include internal memory (e.g., RAM, ROM, or a hard disk drive) and/or removable memory (e.g., removable via a universal serial bus connection). Memory 330 may be a non-transitory computer-readable medium. Memory 330 stores information, instructions, and/or software (e.g., one or more software applications) related to the operation of device 300. In some implementations, memory 330 may include one or more memories that are coupled to one or more processors (e.g., processor 320), such as via bus 310.

Input component 340 enables device 300 to receive input, such as user input and/or sensed input. For example, input component 340 may include a touch screen, a keyboard, a keypad, a mouse, a button, a microphone, a switch, a sensor, a global positioning system sensor, an accelerometer, a gyroscope, and/or an actuator. Output component 350 enables device 300 to provide output, such as via a display, a speaker, and/or a light-emitting diode. Communication component 360 enables device 300 to communicate with other devices via a wired connection and/or a wireless connection. For example, communication component 360 may include a receiver, a transmitter, a transceiver, a modem, a network interface card, and/or an antenna.

Device 300 may perform one or more operations or processes described herein. For example, a non-transitory computer-readable medium (e.g., memory 330) may store a set of instructions (e.g., one or more instructions or code) for execution by processor 320. Processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry is used instead of or in combination with the instructions to perform one or more operations or processes described herein. Additionally, or alternatively, processor 320 may be configured to perform one or more operations or processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
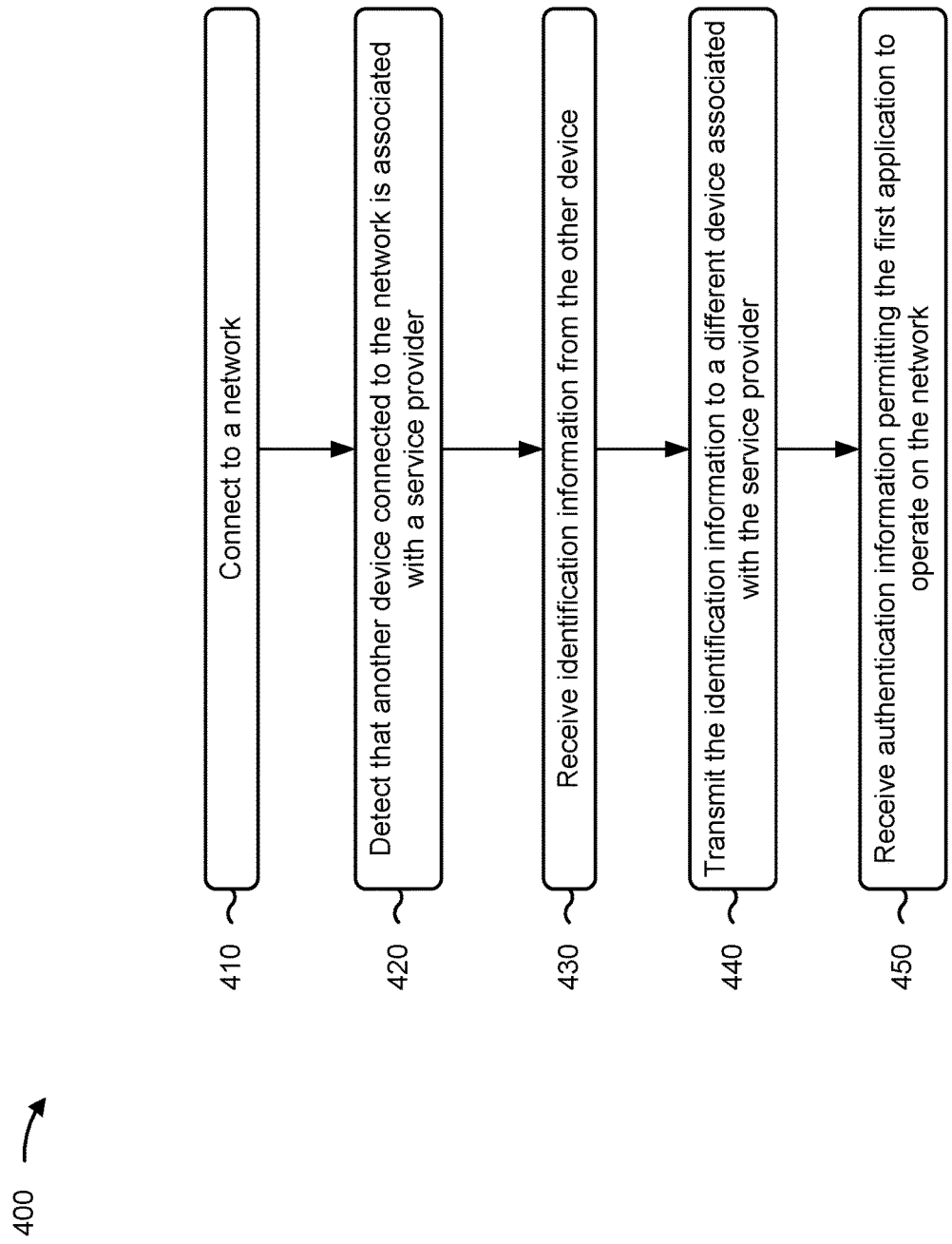
FIG. 4 is a flowchart of an example process associated with authenticating users for subscribed services.

FIG. 4 is a flowchart of an example process 400 associated with authenticating users for subscribed services. In some implementations, one or more process blocks of FIG. 4 may be performed by a first device (e.g., new device 140). In some implementations, one or more process blocks of FIG. 4 may be performed by another device or a group of devices separate from or including the first device, such as a backend device (e.g., backend device 230), a UE (e.g., UE 240), a networking device (e.g., networking device 250), and/or a client device (e.g., first client device 260 and/or second client device 270). Additionally, or alternatively, one or more process blocks of FIG. 4 may be performed by one or more components of device 300, such as processor 320, memory 330, input component 340, output component 350, and/or communication component 360.

As shown in FIG. 4, process 400 may include connecting to a network (block 410). For example, the first device (e.g., the new device 140) may connect to a network (e.g., the first network 110). In some implementations, the first device that connects to the network may be associated with a first application that is associated with a service provider, and, in some implementations, the network may also be associated with the service provider.

As further shown in FIG. 4, process 400 may include detecting that a second device connected to the network is associated with the service provider (block 420). For example, the first device may detect that a second device (e.g., one of the first client device 130, the second client device 135, or the first networking device 120) connected to the network is associated with the service provider, as described above. In some implementations, the first device may detect that a second application associated with the second device is associated with the service provider. Additionally, or alternatively, the first device may transmit a broadcast message over the network, and may detect that the second device connected to the network is associated with the second application that is associated with the service provider based on a message transmitted by the second device in response to the second device receiving the broadcast message. In some implementations, the broadcast message may be a UDP message, and the message transmitted by the second device in response to the second device receiving the broadcast message may be one of a UDP message or a TCP/IP message, as described above.

As further shown in FIG. 4, process 400 may include receiving, from the second device, identification information associated with the second device (block 430). For example, the first device may receive, from the second device, identification information associated with the second device, as described above. In some implementations, the identification information associated with the second device may include a serial number associated with the second device, as described above.

As further shown in FIG. 4, process 400 may include transmitting, to a third device associated with the service provider, the identification information associated with the second device (block 440). For example, the first device may transmit, to a third device associated with the service provider (e.g., the backend device 105), the identification information associated with the second device, as described above.

As further shown in FIG. 4, process 400 may include receiving, from the third device, authentication information permitting the first application to operate on the network (block 450). For example, the first device may receive, from the third device, authentication information (e.g., an authentication token) permitting the first application to operate on the network, as described above. In some implementations, the authentication information may be received by the first device from the third device based on the third device receiving the identification information associated with the second device. Additionally, or alternatively, in some implementations, the authentication information may be associated with the identification information in a database associated with the third device, as described above.

In some implementations, process 400 includes connecting, by the first device, to another network (e.g., the second network 115). In some implementations, the first device may transmit, to the third device, identification information associated with the first device and the authentication information (e.g., the last-used authentication token). Additionally, or alternatively, the first device may receive, from the third device, additional authentication information (e.g., an updated authentication token) permitting the first application to operate on the other network based on the third device receiving the identification information associated with the first device and the authentication information, as described above.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   connecting, by a first device, to a first network, wherein the first device is associated with a first application that is associated with a service provider;
   detecting, by the first device, that a second device connected to the first network is associated with a second application that is associated with the service provider, wherein the second device is permitted to operate on a second network;
   receiving, by the first device and from the second device, identification information associated with the second device;
   transmitting, by the first device and to a third device associated with the service provider, the identification information associated with the second device, wherein the third device is included in the second network;
   receiving, by the first device and from the third device, authentication information permitting the first application to operate on the second network based on the third device receiving the identification information associated with the second device;
   transmitting, by the first device and to the third device, identification information associated with the first device and the authentication information; and
   receiving, by the first device and from the third device, additional authentication information permitting the first application to operate on the second network based on the third device receiving the identification information associated with the first device and the authentication information.

2. The method of claim 1, wherein the second network is a core network associated with the service provider.

3. The method of claim 1, further comprising transmitting, by the first device, a broadcast message over the first network, wherein detecting that the second device connected to the first network is associated with the second application that is associated with the service provider is based on a message transmitted by the second device in response to the second device receiving the broadcast message.

4. The method of claim 3, wherein the broadcast message is a user datagram protocol (UDP) message, and wherein the message transmitted by the second device in response to the second device receiving the broadcast message is one of a UDP message or a transmission control protocol/Internet protocol message.

5. The method of claim 1, wherein the identification information associated with the second device includes a serial number associated with the second device.

6. The method of claim 1, wherein the authentication information is associated with the identification information in a database associated with the third device.

7. The method of claim 1, further comprising:
connecting, by the first device, to the second network based on receiving the identification information associated with the second device.

8. A first device, comprising:
one or more processors configured to:
connect to a first network, wherein the first device is associated with a first application that is associated with a service provider;
detect that a second device connected to the first network is associated with a second application that is associated with the service provider, wherein the second device is permitted to operate on a second network;
receive, from the second device, identification information associated with the second device;
transmit, to a third device associated with the service provider, the identification information associated with the second device, wherein the third device is included in the second network;
receive, from the third device, authentication information permitting the first application to operate on the second network based on the third device receiving the identification information associated with the second device;
transmit, to the third device, identification information associated with the first device and the authentication information; and
receive, from the third device, additional authentication information permitting the first application to operate on the second network based on the third device receiving the identification information associated with the first device and the authentication information.

9. The first device of claim 8, wherein the second network is a core network associated with the service provider.

10. The first device of claim 8, wherein the one or more processors are further configured to transmit a broadcast message over the first network, wherein detecting that the second device connected to the first network is associated with the second application that is associated with the service provider is based on a message transmitted by the second device in response to the second device receiving the broadcast message.

11. The first device of claim 10, wherein the broadcast message is a user datagram protocol (UDP) message, and wherein the message transmitted by the second device in response to the second device receiving the broadcast message is one of a UDP message or a transmission control protocol/Internet protocol message.

12. The first device of claim 8, wherein the identification information associated with the second device includes a serial number associated with the second device.

13. The first device of claim 8, wherein the authentication information is associated with the identification information in a database associated with the third device.

14. The first device of claim 8, wherein the one or more processors are further configured to:
connect to the second network based on receiving the identification information associated with the second device.

15. A non-transitory computer-readable medium storing a set of instructions, the set of instructions comprising:
one or more instructions that, when executed by one or more processors of a first device, cause the first device to:
connect to a first network, wherein the first device is associated with a first application that is associated with a service provider;
detect that a second device connected to the first network is associated with a second application that is associated with the service provider, wherein the second device is permitted to operate on a second network;
receive, from the second device, identification information associated with the second device;
transmit, to a third device associated with the service provider, the identification information associated with the second device, wherein the third device is included in the second network;
receive, from the third device, authentication information permitting the first application to operate on the second network based on the third device receiving the identification information associated with the second device;
transmit, to the third device, identification information associated with the first device and the authentication information; and
receive, from the third device, additional authentication information permitting the first application to operate on the second network based on the third device receiving the identification information associated with the first device and the authentication information.

16. The non-transitory computer-readable medium of claim 15, wherein the second network is a core network associated with the service provider.

17. The non-transitory computer-readable medium of claim 15, wherein the one or more instructions further cause the first device to transmit a broadcast message over the first network, wherein detecting that the second device connected to the first network is associated with the second application that is associated with the service provider is based on a message transmitted by the second device in response to the second device receiving the broadcast message.

18. The non-transitory computer-readable medium of claim 17, wherein the broadcast message is a user datagram protocol (UDP) message, and wherein the message transmitted by the second device in response to the second device receiving the broadcast message is one of a UDP message or a transmission control protocol/Internet protocol message.

19. The non-transitory computer-readable medium of claim 15, wherein the identification information associated with the second device includes a serial number associated with the second device.

20. The non-transitory computer-readable medium of claim 15, wherein the one or more instructions further cause the first device to:
   connect to the second network based on receiving the identification information associated with the second device.

\* \* \* \* \*